United States Patent
Park et al.

(10) Patent No.: US 11,543,134 B2
(45) Date of Patent: Jan. 3, 2023

(54) HEATING APPARATUS AND METHOD FOR CONTROLLING THE SAME

(71) Applicant: LG ELECTRONICS INC., Seoul (KR)

(72) Inventors: Jun Park, Seoul (KR); Young Min Lee, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 771 days.

(21) Appl. No.: 16/572,452

(22) Filed: Sep. 16, 2019

(65) Prior Publication Data

US 2020/0011534 A1 Jan. 9, 2020

(30) Foreign Application Priority Data

Aug. 7, 2019 (KR) .......................... 10-2019-0096362

(51) Int. Cl.
*F24C 7/08* (2006.01)
*G06N 3/08* (2006.01)
*G05B 19/042* (2006.01)
*G06F 1/26* (2006.01)

(52) U.S. Cl.
CPC ............... *F24C 7/08* (2013.01); *F24C 7/086* (2013.01); *G05B 19/0428* (2013.01); *G06F 1/26* (2013.01); *G06N 3/08* (2013.01)

(58) Field of Classification Search
None
See application file for complete search history.

(56) References Cited

U.S. PATENT DOCUMENTS

| 8,723,085 | B2 | 5/2014 | Callahan et al. |
| 2013/0033448 | A1* | 2/2013 | Yano ........................ G06F 3/018 345/173 |
| 2013/0194217 | A1* | 8/2013 | Lee .......................... G06F 3/041 345/173 |
| 2016/0320068 | A1* | 11/2016 | Koehler .................. F24C 7/086 |
| 2017/0023255 | A1* | 1/2017 | Bach ....................... F24C 7/086 |
| 2021/0146778 | A1* | 5/2021 | Carvalho ............... B60K 35/00 |

FOREIGN PATENT DOCUMENTS

KR 101390397 4/2014

* cited by examiner

*Primary Examiner* — Tuan S Nguyen
(74) *Attorney, Agent, or Firm* — Lee, Hong, Degerman, Kang & Waimey PC

(57) ABSTRACT

The present disclosure relates to a heating apparatus for preventing a safety accident, which may operate in an IoT environment through a 5G communication network, and a method of controlling such a heating apparatus. The heating apparatus according to the present disclosure may determine the intention of the user's touch by using a deep neural network model trained through artificial machine learning. A heating apparatus for preventing safety accidents includes a top plate, a heater disposed under the top plate, an interface displayed on the top plate to allow a user to select an operation of the heating apparatus, and a controller configured to turn on the power of the heating apparatus when the power touch area is touched and to block an input of the power touch area in a situation where the lock touch area is touched.

14 Claims, 11 Drawing Sheets

HEATING APPARATUS AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Patent Application No. 10-2019-0096362, filed on Aug. 7, 2019, the contents of which are hereby incorporated by reference herein in its entirety.

BACKGROUND

1. Technical Field

The present disclosure relates to a heating apparatus for preventing a safety accident and a method for controlling such a heating apparatus. More particularly, the present disclosure relates to a safety accident prevention heating apparatus and a control method of such a heating apparatus, in which the power is turned on only by a gesture of a user who intends to turn on the heating apparatus and the power is not turned on in case of other accidental touch.

2. Description of Related Art

When heating is performed for more than a predetermined time without user's monitoring, the heating apparatus may cause a fire.

Recently, as an operation of a heating apparatus such as a microwave is changed based on a touch, the probability of malfunction due to unintentional touch has increased.

In particular, if there are children or pets in your home, the accidental touch of a child or pet will turn on the electric range and the heating operation is started. If heating is neglected, it leads to a fire accident.

In relation to this, Korean Patent Publication No. 1,390,397 is an invention related to "Safety control device and safety control method of a kitchen cooking appliance", and discloses a method of reducing the amount of heating when a food is about to boil after capturing an image of a food to be cooked by installing a CCD camera on a heater body and then, interpreting the captured image.

In order to implement the technique disclosed in the above-mentioned document, it is difficult to additionally install a separate CCD camera so that the heater may be viewed from above, and considerable processing resources are required to analyze the captured image. In addition, there is a limitation in that the technique of the above-mentioned document does not prevent the malfunction itself by unintended operation.

On the other hand, U.S. Pat. Publication No. 8,723,085 is an invention related to a "temperature control/limiting heating element for electric cooking appliances", and discloses a configuration in which the power supply is cut off using a temperature limit switch when more than a predetermined temperature is reached.

In the technique disclosed in the above-mentioned document, a safety accident due to excessive heating may be prevented, but the technique does not provide a fundamental prevention for the malfunction itself due to a wrong operation.

In order to overcome the above limitations, there is a need to provide a solution that prevents operations of the heating apparatus from being performed, which may cause a safety accident for a touch not intended by a user.

On the other hand, the above-described prior art is technical information that the inventor holds for deriving the present disclosure or is acquired in the derivation process of the present disclosure, and is not necessarily a known technology disclosed to the general public before the application of the present disclosure.

SUMMARY OF THE INVENTION

An aspect of the present disclosure is to solve the problem in the related art that a safety accident occurs by turning on a heating apparatus and starting a heating operation even if a user does not intend.

Another aspect of the present disclosure is to solve the problem of having to configure a separate additional device in a heating apparatus to prevent a safety accident that may occur due to malfunction of the heating apparatus.

Another aspect of the present disclosure is to provide a heating apparatus according to the embodiment of the present disclosure to solve the inconvenience and hassle caused by the current UI due to various steps, such as power on, adjustment of the heating level, and locking for safety.

Another aspect of the present disclosure is to provide a heating apparatus according to the embodiment of the present disclosure to solve the problem of remembering and pressing the locking function required to press an additional button for every operation even if a user pays attention to preventing malfunction.

Another aspect of the present disclosure is to solve the problem that the gesture set to select the operation of a heating apparatus does not intuitively express the user's intention.

A heating apparatus for preventing a safety accident and a method for controlling the same according to an embodiment of the present disclosure match the intentional touch action to be an indication for the corresponding operation in the case of an operation of turning on the power of the heating apparatus and an operation of increasing a heating level, which are the main operations that may lead to a safety accident.

A heating apparatus for preventing a safety accident and a method for controlling the same according to an embodiment of the present disclosure may be configured such that the heating apparatus is turned on only in response that touch areas disposed at different positions are touched together for a predetermined time or more.

A heating apparatus for preventing a safety accident and a method for controlling the same according to an embodiment of the present disclosure may be configured to surround at least one of the touch areas disposed at different positions with the lock touch area and to block another touch input in response that the lock touch area is touched.

According to an embodiment of the present disclosure, a heating apparatus for preventing safety accidents may include a top plate configured to support a heating target, a heater disposed under the top plate to heat the heating target, an interface displayed on the top plate to allow a user to select an operation of the heating apparatus, and a controller configured to control on, off, and heating operations of the heating apparatus according to the selection of the interface.

Here, the interface includes a power touch area and a lock touch area and the controller may be configured to turn on the power of the heating apparatus in response that the power touch area is touched, and configured to block an input of the power touch area in a situation where the lock touch area is touched.

In addition, the lock touch area may be disposed adjacent to the power touch area, and configured to surround at least a portion of the power touch area.

In addition, the controller may be further configured to turn on the power of the heating apparatus in response that the power touch area is touched for a predetermined time or more.

According to another embodiment of the present disclosure, the power touch area may include a first touch area and a second touch area separated from each other, and the lock touch area may be disposed to surround at least one of the first touch area and the second touch area.

Here, the controller may be configured to turn on the power only in response that the first touch area and the second touch area are touched together.

In addition, the first touch area and the second touch area may have a shape in which a length is longer than a width, and the first touch area and the second touch area may be disposed parallel to each other in a length direction. The controller may be further configured to turn on the power of the heating apparatus in response that a lower part of the first touch area and a lower part of the second touch area are touched together.

In addition, after the power of the heating apparatus is turned on, in a state where the first touch area and the second touch area are touched together, in response that a user's touch moves from a lower part to an upper part in the length direction of the first touch area and the second touch area, the controller may be further configured to increase a heating level of the heating apparatus.

Furthermore, after the power of the heating apparatus is turned on, in a state where only the second touch area is touched, in response that a user's touch moves from a lower part to an upper part in the length direction of the second touch area, the controller may be further configured to increase a heating duration time of the heating apparatus.

According to another embodiment of the present disclosure, the first touch area may be a circle, the second touch area may be disposed to surround at least a portion of the first touch area in a truncated fan shape, and the lock touch area may be disposed between the first touch area and the second touch area to surround at least a portion of the first touch area.

In addition, the controller may be further configured to turn on the heating apparatus in response that the first touch area and the second touch area are touched together for a predetermined time or more.

In addition, after the power of the heating apparatus is turned on, in a state where the first touch area and the second touch area are touched together, if a touch in the second touch area moves counterclockwise or clockwise, the controller may be further configured to increase a heating level in proportion to a traveled distance.

Furthermore, after the power of the heating apparatus is powered on, in a state where only the second touch area is touched, if a touch in the second touch area moves counterclockwise or clockwise, the controller may be further configured to increase a heating duration time of the heating apparatus in proportion to a traveled distance.

According to an embodiment of the present disclosure, a control method of a heating apparatus for preventing safety accidents may include detecting whether a power touch area or a lock touch area is touched in an interface displayed on a top plate of the heating apparatus, turning on the power of the heating apparatus in response that it is detected that the power touch area is touched for a predetermined time without touching the lock touch area, and blocking an input through the power touch area if it is detected that the lock touch area is touched.

Here, the lock touch area may be disposed adjacent to the power touch area, and configured to surround at least a portion of the power touch area.

According to another embodiment of the present disclosure, the power touch area may include a first touch area and a second touch area separated from each other, and the lock touch area may be disposed to surround at least one of the first touch area and the second touch area.

Here, the turning on the power may include turning on the power of the heating apparatus in response that the first touch area and the second touch area are touched together for a predetermined time or more.

In addition, the power touch area may include a first touch area and a second touch area separated from each other, the lock touch area may be disposed to surround at least one of the first touch area and the second touch area, the first touch area and the second touch area may have a shape in which a length is longer than a width, and the first touch area and the second touch area may be disposed parallel to each other in a length direction.

Here, the turning on the power may include turning on the power of the heating apparatus in response that a lower part of the first touch area and a lower part of the second touch area are touched together for a predetermined time or more.

In addition, the method may include, after the power of the heating apparatus is turned on, in a state where the first touch area and the second touch area are touched together, in response that it is detected that a user's touch moves from a lower part to an upper part in the length direction of the first touch area and the second touch area, increasing a heating level of the heating apparatus.

Furthermore, the method may further include, after the power of the heating apparatus is turned on, in a state where only the second touch area is touched, in response that it is detected that a user's touch moves from a lower part to an upper part in the length direction of the second touch area, increasing a heating duration time of the heating apparatus.

In another embodiment of the present disclosure, the power touch area may include a first touch area and a second touch area separated from each other, the lock touch area may be disposed to surround at least one of the first touch area and the second touch area, the first touch area may be a circle, the second touch area may be disposed to surround at least a portion of the first touch area in a truncated fan shape, and the lock touch area may be disposed between the first touch area and the second touch area to surround at least a portion of the first touch area.

Here, the turning on the power may include turning on the power of the heating apparatus in response that it is detected that the first touch area and the second touch area are touched together for a predetermined time or more.

In addition, the method may further include, after the power of the heating apparatus is turned on, in a state where the first touch area and the second touch area are touched together, if it is detected that a touch in the second touch area moves counterclockwise or clockwise, increasing a heating level in proportion to a traveled distance.

In addition, according to another embodiment of the present disclosure, the method may further include, after the power of the heating apparatus is powered on, in a state where only the second touch area is touched, if it is detected that a touch in the second touch area moves counterclockwise or clockwise, increasing a heating duration time of the heating apparatus in proportion to a traveled distance.

In addition, in relation to a heating apparatus for preventing a safety accident according to an embodiment of the present disclosure, the computer readable medium may be a computer readable recording medium having stored thereon a computer program for executing any one of the methods described above.

Other aspects, features, and advantages other than those described above will become apparent from the following drawings, claims, and detailed description of the invention.

DETAILED DESCRIPTION

Figure 1:
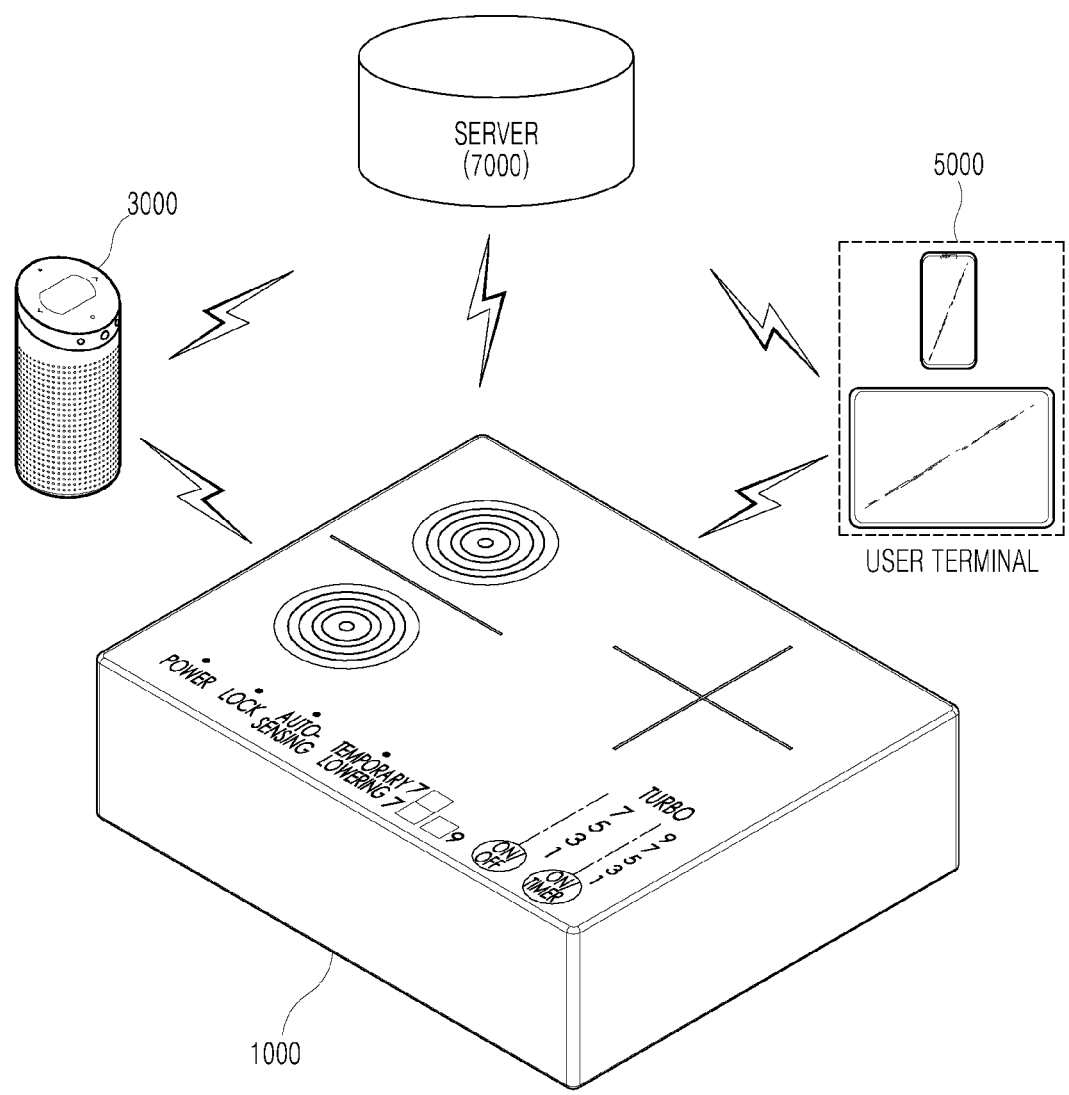
FIG. 1 is a view illustrating an environment in which a heating apparatus for preventing a safety accident operates according to an embodiment of present disclosure.

Advantages and features of the present disclosure and methods for achieving them will become apparent from the descriptions of aspects herein below with reference to the accompanying drawings. However, the description of particular example embodiments is not intended to limit the present disclosure to the particular example embodiments disclosed herein, but on the contrary, it should be understood that the present disclosure is to cover all modifications, equivalents and alternatives falling within the spirit and scope of the present disclosure. The example embodiments disclosed below are provided so that the present disclosure will be thorough and complete, and also to provide a more complete understanding of the scope of the present disclosure to those of ordinary skill in the art. In the interest of clarity, not all details of the relevant art are described in detail in the present specification in so much as such details are not necessary to obtain a complete understanding of the present disclosure.

The terminology used herein is used for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "includes," "including," "containing," "has," "having" or other variations thereof are inclusive and therefore specify the presence of stated features, integers, steps, operations, elements, and/or components, but do not preclude the presence or addition of one or more other features, integers, steps, operations, elements, components, and/or groups thereof. Furthermore, these terms such as "first," "second," and other numerical terms may be used herein only to describe various elements, but these elements should not be limited by these terms. These terms may be only used to distinguish one element, component, region, layer or section from another region, layer or section.

Hereinbelow, the embodiments of the present disclosure will be described in greater detail with reference to the accompanying drawings, and on all these accompanying drawings, the identical or analogous elements are designated by the same reference numeral, and repeated description of the common elements will be omitted.

In addition, a heating apparatus according to an embodiment of the present disclosure may include a heating apparatus used for various purposes, such as cooking, experiment, product manufacturing, and the like, but hereinafter, embodiments of the present disclosure will be described with reference to a microwave used for cooking for convenience of description.

FIG. 1 is a view illustrating an environment in which a heating apparatus for preventing a safety accident operates according to an embodiment of present disclosure.

According to an embodiment of the present disclosure, a microwave 1000 may communicate with an artificial intelligence speaker 3000 installed in a home and may communicate with a user terminal 5000 and an external server 7000, through a communication network.

In the home in which the microwave 1000 is disposed, an IoT environment may be implemented through 5G communication, and various home appliances and a user terminal may be configured to communicate with each other.

The microwave 1000 may receive a user's command indicated by voice through the artificial intelligence speaker 3000, and on the contrary, notify the state occurring in the microwave 1000 to the user by voice through the artificial intelligence speaker 3000.

In addition, the microwave 1000 may receive an instruction of the user through the user terminal 5000, and on the contrary, transmit a state occurring in the microwave 1000 to the user through the user terminal 5000.

In addition, the microwave 1000 may communicate with a server 7000, such as a home network server, so that it may receive various information in the home, such as information on the operation states of other home appliances and the temperature, humidity, air cleanliness, and lighting conditions of the home.

On the contrary, the microwave 1000 may also notify the server 7000 of its operation history so that other home appliances and the user terminal 5000 may use it.

Especially, when a dangerous situation is detected, such as a situation in which a heating operation lasts too long and a temperature rises above a predetermined degree and lasts for more than a predetermined time, the microwave 1000 may notify this to the user through the artificial intelligence speaker 3000 or the user terminal 5000.

In addition, a gesture for an operation of turning on and off the microwave 1000, increasing and decreasing a heating level, or setting an operation timer may be set using the user terminal 5000.

For example, a user may set the gesture for turning on the microwave 1000 through the user terminal 5000 with pressing the two on-buttons together for at least 3 seconds, or set the gesture for increasing the heating level of the microwave 100 with a touch of an operation of sliding up the two on-buttons.

Figure 2:
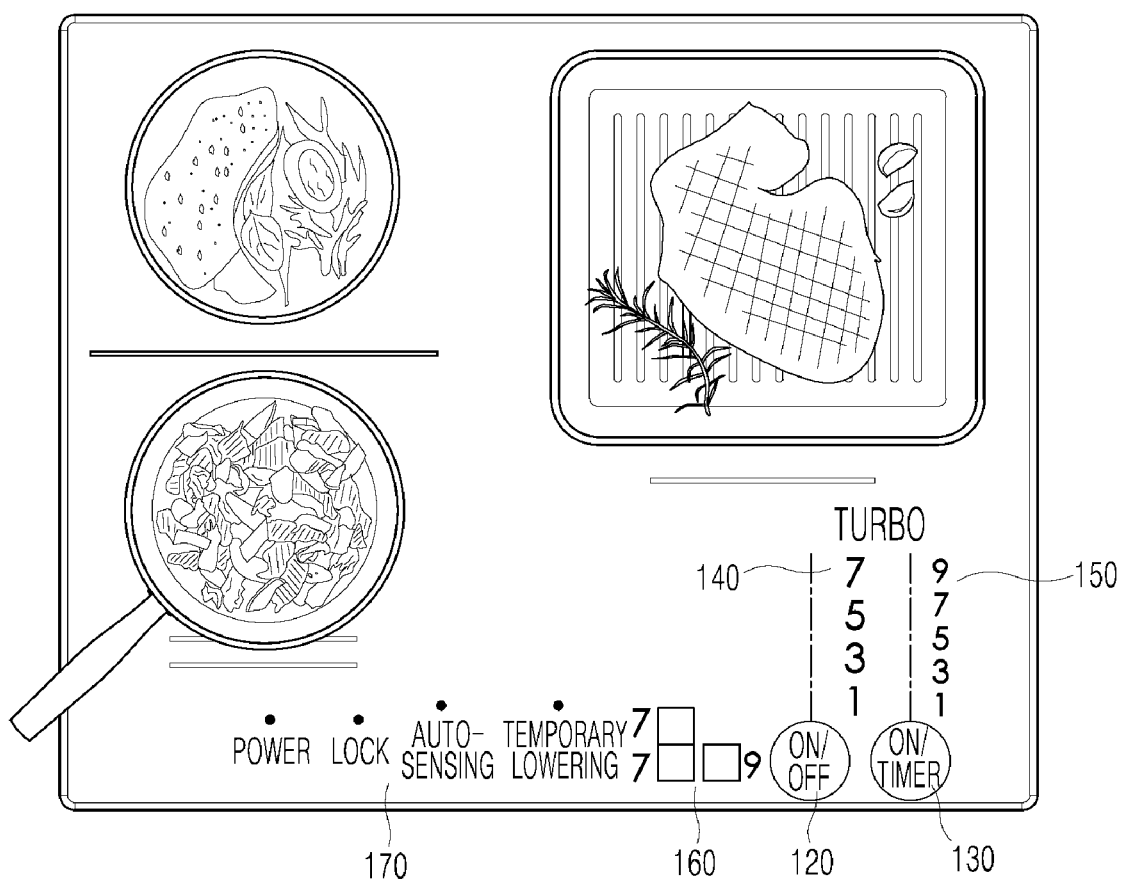
FIG. 2 is a view illustrating an interface of a heating apparatus for preventing a safety accident according to an embodiment of present disclosure.

FIG. 2 is a view illustrating an interface of a heating apparatus for preventing a safety accident according to an embodiment of present disclosure.

According to an embodiment of the present disclosure, a microwave 1000 may include a top plate for supporting a cooking tool containing a food to be heated and a heater disposed under the top plate to heat the heating target.

An interface may be disposed on the top plate of the microwave 1000 so that the user may view the interface to select the operation of the microwave 1000.

According to the selection of the interface, commands for the on, off, and heating operation of the microwave may be transmitted to the controller of the microwave, and the operation of the microwave may be controlled by the controller.

A first button 120 and a second button 130 may be disposed at the interface, and the microwave 1000 may be set to be turned on only when the first and second buttons 120 and 130 are touched together.

If there is only one on-button, and the power is turned on when one on-button is touched, the microwave may be turned on inadvertently when pets step on the on-button or lick the on-button with their tongues as passing over the microwave.

However, the interface of the microwave according to the present disclosure includes a plurality of on-buttons 120 and 130, and the microwave is configured to be turned on only when the plurality of on-buttons 120 and 130 are all touched.

Usually, since it is more advantageous to determine whether a touch at two points is an intentional action than a touch at one point, the configuration in which the microwave is turned on when all the on-buttons are touched as described above may greatly reduce the probability of malfunction due to an unintended touch.

Also, only if all the on-buttons 120 and 130 are touched continuously for a certain time (e.g. 3 seconds or more), the power of the microwave may be configured to be turned on, and accordingly, the intention of the user may be more clearly distinguished.

The gesture when turning off the power is set to the case where only the first button 120 is touched so that when only the first button 120 is touched, the microwave power may be turned off.

Here, an area where the first button 120 and the second button 130 are located may be referred to as a power touch area.

On the other hand, although not shown in FIG. 2, when the areas adjacent to the first button 120 and the second button 130 are touched, the controller of a microwave may be configured to block a touch input at the first button 120 and the second button 130.

According to this configuration, even if the first button 120 and the second button 130 are both touched by chance, the adjacent area must not be touched at all to turn on the power, and if adjacent areas are touched, the power may not be turned on.

In such a manner, an area that is disposed adjacent to the power touch area and performs a locking function may be referred to as a lock touch area, and the lock touch area may be disposed adjacent to the power touch area and may surround at least a portion of the power touch area.

That is, the controller of the microwave may be configured to turn on the microwave when the power touch area is touched, and to block the input of the power touch area when the lock touch area is touched. Accordingly, malfunction of the microwave due to an unintended touch may be prevented.

After the first button 120 and the second button 130 are touched together for a predetermined time or more, when the microwave power is turned on, the user may slide up two fingers to increase the heating level.

In this case, the heating level may be displayed while one of the numbers of the heating level display 140 is lit.

If one finger makes a sliding up gesture after only the second button 130 is pressed, the heating duration time may increase.

In this case, one of the numbers of the timer display 150 may be lit and the heating duration time may be displayed.

The burner display 160 may display which crater is operating and what is the duration time or heating level of each crater.

The state display 170 may display whether the microwave is powered on, whether the microwave is in a locking mode, whether the auto-sensing mode is activated, or whether the temporary lowering function is operating.

Figure 3:
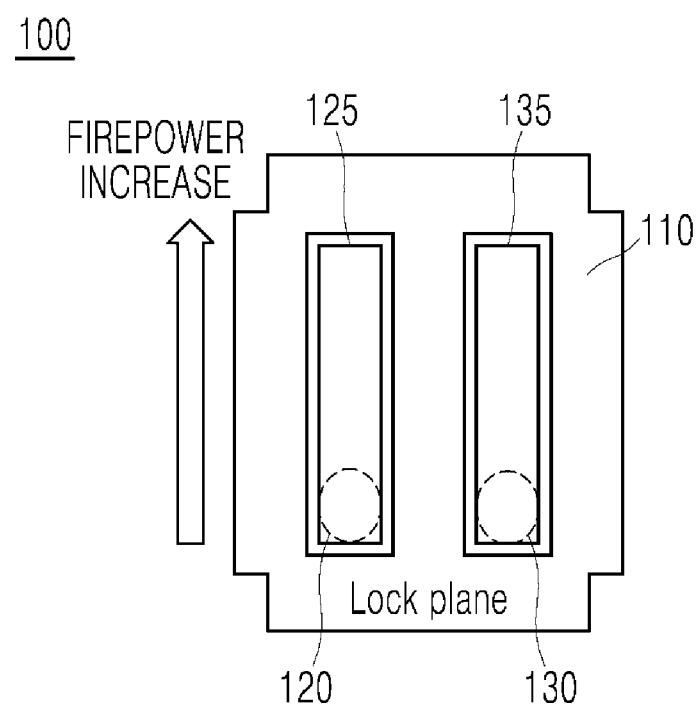
FIG. 3 is a view illustrating a configuration of a touch panel of a heating apparatus for preventing a safety accident according to an embodiment of the present disclosure.

FIG. 3 is a view illustrating a configuration of a touch panel of a heating apparatus for preventing a safety accident according to an embodiment of the present disclosure.

The touch panel 100 having a power touch area and a lock touch area includes a first touch area 125 and a second touch area 135 having a shape in which the length is longer than the width. Here, the first touch region 125 and the second touch region 135 may be disposed parallel to each other in the length direction as shown in FIG. 3.

Figure 5:
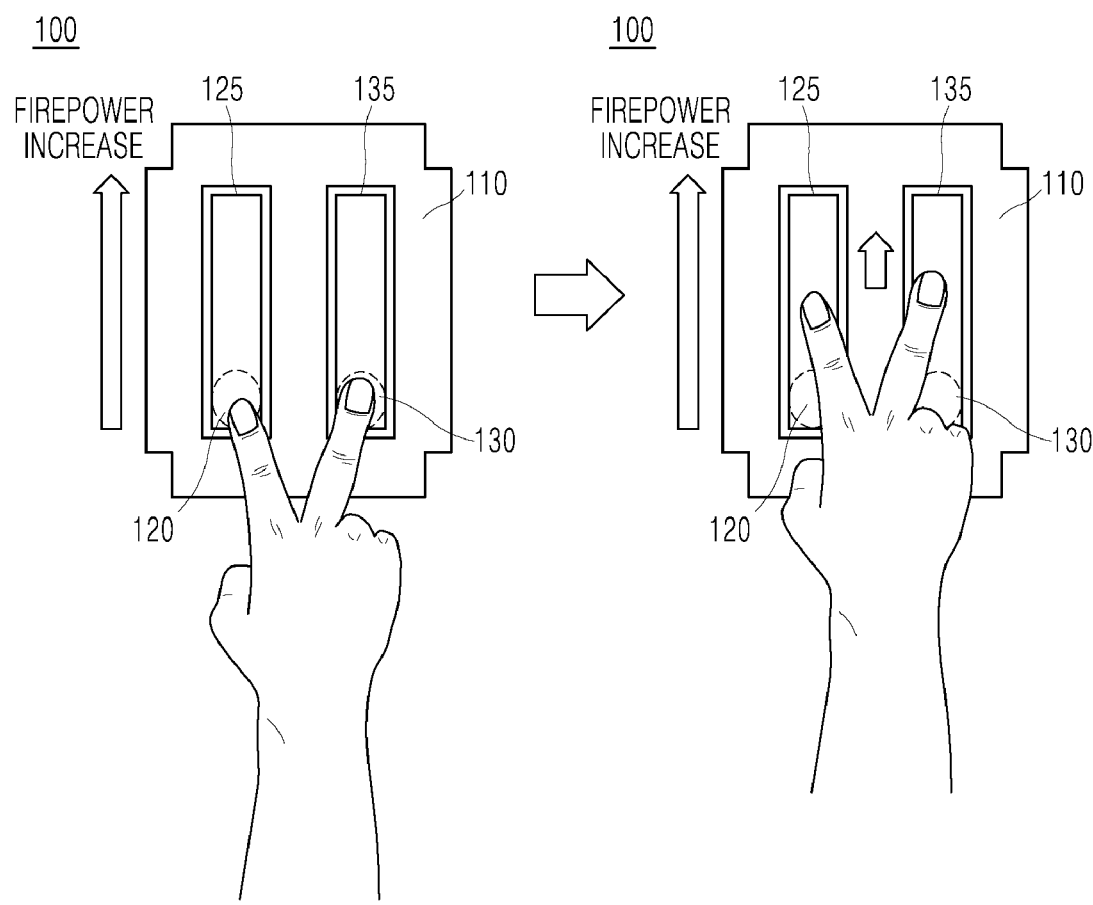
FIG. 5 is a view illustrating a touch gesture for a power-on operation and a heating level increase operation of a heating apparatus for preventing a safety accident according to an embodiment of present disclosure.

Here, the first touch area 125 and the second touch area 135 may be disposed to be spaced apart from each other, and the separation distance may be designed to a distance enough to be touched by two fingers as shown in FIG. 5.

The lower part of the first touch area 125 and the lower part of the second touch area 135 may be allocated to the first button 120 and the second button 130 which perform the function of the on-button.

Therefore, when the lower part of the first touch area 125 and the lower part of the second touch area 135 are touched for a predetermined time or more, the power of the microwave may be turned on.

On the other hand, the area surrounding the first touch area 125 and the second touch area 135 is the lock touch area 110, and when any portion of the lock touch area 110 is touched, the area may be configured to block all touch inputs to the first touch area 125 and the second touch area 135.

In FIG. 3, the lock touch area 110 surrounds both the first touch area 125 and the second touch area 135 but the lock touch area 110 may be designed to surround a portion of at least one of the first touch area 125 and the second touch area 135.

According to this configuration, a user who intends to turn on the power should touch only the first button 120 and the second button 130, and not the peripheral part thereof, to turn on the power.

That is, even if a child or pet accidentally touches the first button 120 and the second button 130 together, the power of the microwave 1000 is turned on only when the adjacent lock touch area 110 is not touched.

However, in the unintentional touch activity, even if both the first button 120 and the second button 130 are accidentally touched, any portion of the lock touch area 110 is likely to be touched so that this configuration may increase the safety by preventing the malfunction of the microwave 1000.

Figure 4:
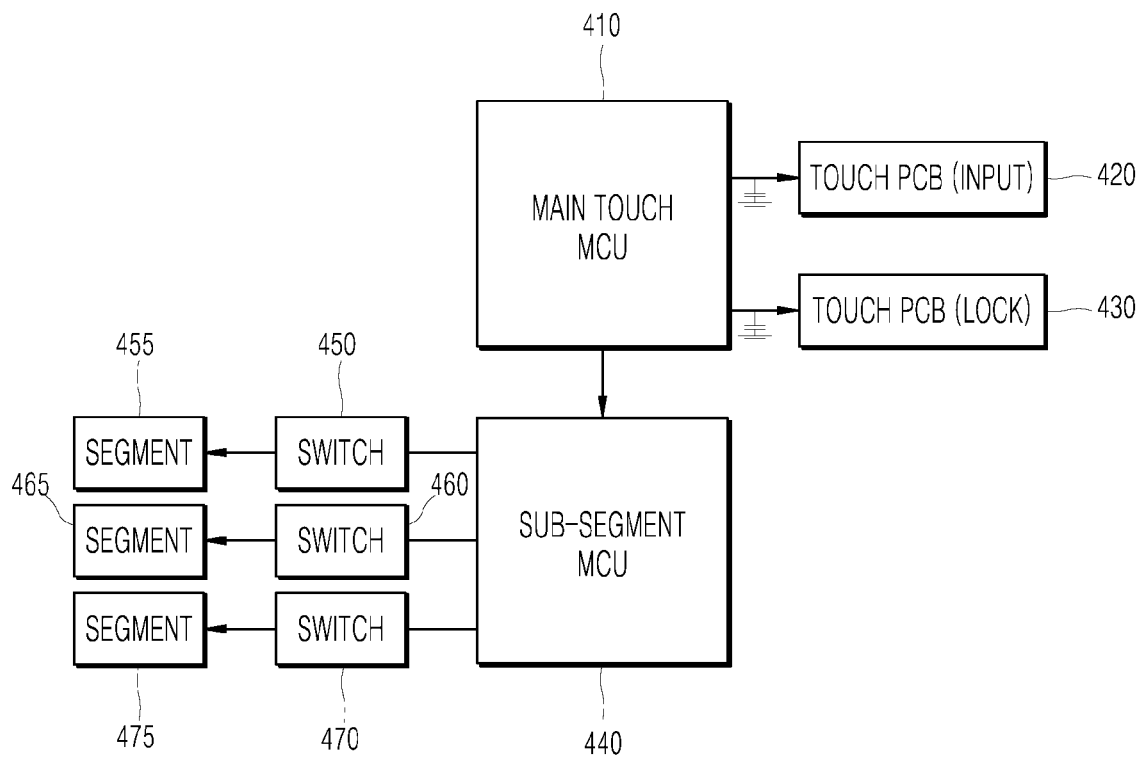
FIG. 4 is a view illustrating an interface related configuration of a heating apparatus for preventing a safety accident according to an embodiment of present disclosure.

FIG. 4 is a view illustrating an interface related configuration of a heating apparatus for preventing a safety accident according to an embodiment of present disclosure.

A microwave 1000 operating with a touch according to an embodiment of the present disclosure includes a main touch MCU 410, an input touch PCB 420 connected to the main touch MCU 410, a lock touch PCB 430, and a sub-segment MCU 440 for controlling operations of segments 455, 465, and 475.

The input touch PCB 420 is for inputting a command such as the first touch area 125 and the second touch area 135, and the like, and the lock touch PCB 430 is for blocking a command inputted through the input touch PCB 420 such as the lock touch area 110.

The main touch MCU 410 transmits to the sub-segment MCU 440 about the operation to be performed according to the touch of the input touch PCB 420, and the sub-segment MCU 440 adjusts the segments 455, 465, and 475 through the switches 450, 460, and 470 so that a desired operation may be performed. That is, the main touch MCU 410 may function as a controller that controls the operation of the microwave 1000 according to the touch input.

However, even if a touch signal is inputted from the input touch PCB 420, if a touch signal is inputted from the lock touch PCB 430, the main touch MCU 410 may be configured to block all signals received from the input touch PCB 420.

FIG. 5 is a view illustrating a touch gesture for a power-on operation and a heating level increase operation of a heating apparatus for preventing a safety accident according to an embodiment of present disclosure.

If a user touches the first button 120 and the second button 130 together, which are the lower areas of the first touch area 125 and the second touch area 135, and the touch continues for a predetermined time, the power of the microwave 1000 may be turned on.

After the power of the microwave 1000 is turned on, when the user's touch moves from a lower part to an upper part in the length direction of the first touch area 125 and the second touch area 135 in a state where the first touch area 125 and the second touch area 135 are touched together, it may be controlled to increase the heating level of the microwave 1000.

In a state where the first touch area 125 and the second touch area 135 are touched together, as the fingers moves upwards through a sliding up motion, a higher heating level may be selected.

Since the user may select the heating level directly in a touched state to turn on the power, it is possible to easily control the microwave 1000, and since moving the finger upwards will raise the heating level, it is possible to intuitively understand the operation of instructing the microwave 1000.

Figure 6:
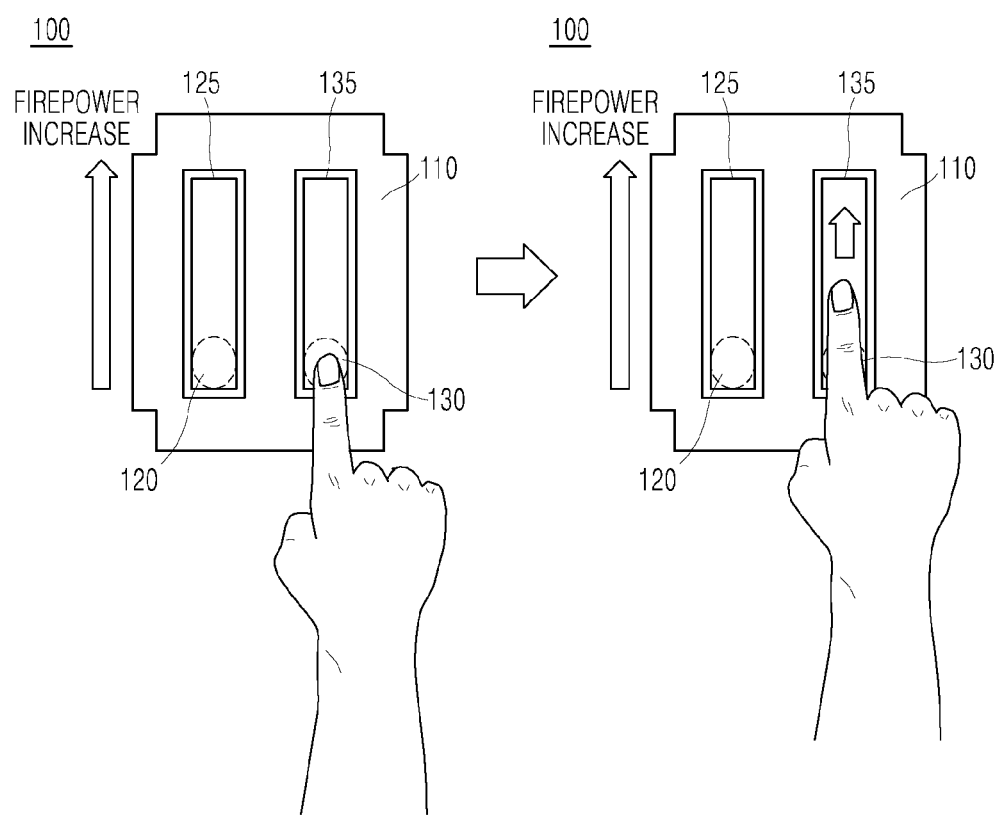
FIG. 6 is a view illustrating a touch gesture for increasing a heating operation time of a heating apparatus for preventing a safety accident according to an embodiment of present disclosure.

FIG. 6 is a view illustrating a touch gesture for increasing a heating operation time of a heating apparatus for preventing a safety accident according to an embodiment of present disclosure.

After the power of the microwave 1000 is turned on, a user may want to set a time for which heating continues.

In this case, when the user's touch moves from a lower part to an upper part in the length direction of the second touch area 135 in a state where only the second touch area 135 is touched, the controller may operate to increase the heating duration time of the microwave 1000.

Since the user may select the heating duration time immediately after lifting one finger from the touched state to turn on the power, it is possible to easily control the microwave 1000, and since moving the finger upwards will raise the heating duration time, it is possible to intuitively understand the operation of instructing the microwave 1000.

Figure 7:
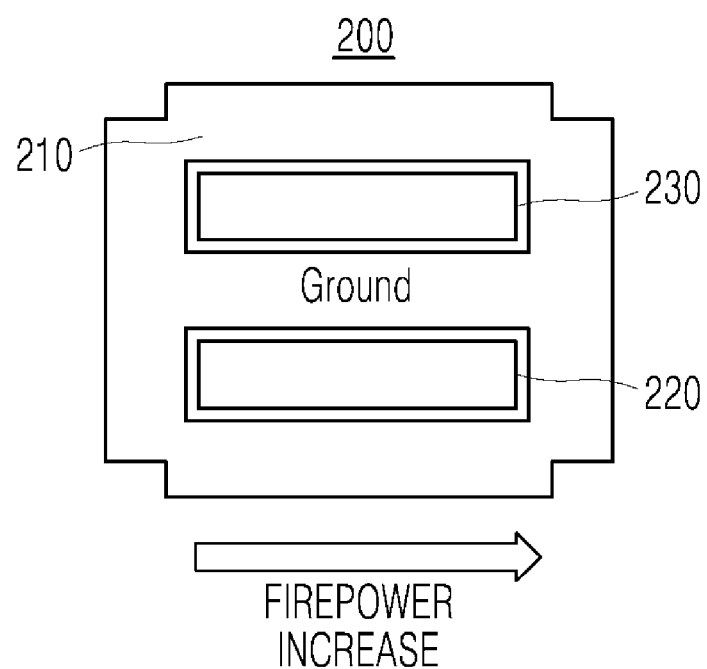
FIG. 7 is a view illustrating a configuration of a touch panel of a heating apparatus for preventing a safety accident according to another embodiment of the present disclosure.

FIG. 7 is a view illustrating a configuration of a touch panel of a heating apparatus for preventing a safety accident according to another embodiment of the present disclosure.

The difference in the touch panel 200 according to the embodiments of FIGS. 5, 6, and 7 is that the embodiments of FIGS. 5 and 6 are arranged vertically while the embodiment of FIG. 7 is arranged horizontally.

A user may turn on the microwave 1000 by touching the left ends of the lower touch area 220 and the upper touch area 230 at the same time for a predetermined time, and in a state where the lower touch area 220 and the upper touch area 230 are touched together, the user may increase the heating level by sliding the finger to the right.

In this case, if the lock touch area 210 is touched, input through the touch of the lower touch area 220 and the upper touch area 230 will all be blocked.

Figure 8:
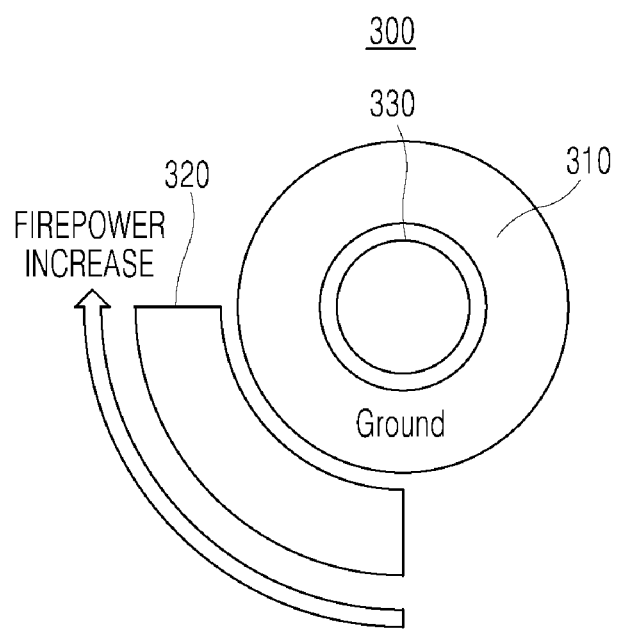
FIG. 8 is a view illustrating a configuration of a touch panel of a heating apparatus for preventing a safety accident according to another embodiment of the present disclosure.

FIG. 8 is a view illustrating a configuration of a touch panel of a heating apparatus for preventing a safety accident according to another embodiment of the present disclosure.

In the embodiment of FIG. 8, the inner touch area 330 is in the form of a circle, and the outer touch area 320 may be disposed to surround at least a portion of the inner touch area 330 in a truncated fan shape.

The lock touch area 310 may be disposed between the inner touch area 330 and the outer touch area 320 to surround at least a portion of the inner touch area 330.

When the inner touch area 330 and the outer touch area 320 are touched together for a predetermined time or more, the microwave 1000 may be turned on.

However, in a state where the lock touch area 310 is touched, touch inputs in the inner touch area 330 and the outer touch area 320 are blocked.

After the power of the microwave 1000 is turned on, in a state where the inner touch area 330 and the outer touch area 320 are touched together, if the touch in the outer touch area 320 moves counterclockwise or clockwise, the controller of the microwave 1000 may be configured to increase the heating level in proportion to the traveled distance.

If a user wants to set the heating duration time, after the power of the microwave 1000 is turned on, in a state where only the outer touch area 320 is touched, if the touch in the outer touch area 320 slides counterclockwise or clockwise, the controller may be configured to increase the heating duration time of the microwave 1000 in proportion to the distance traveled by the user's touch.

Figure 9:
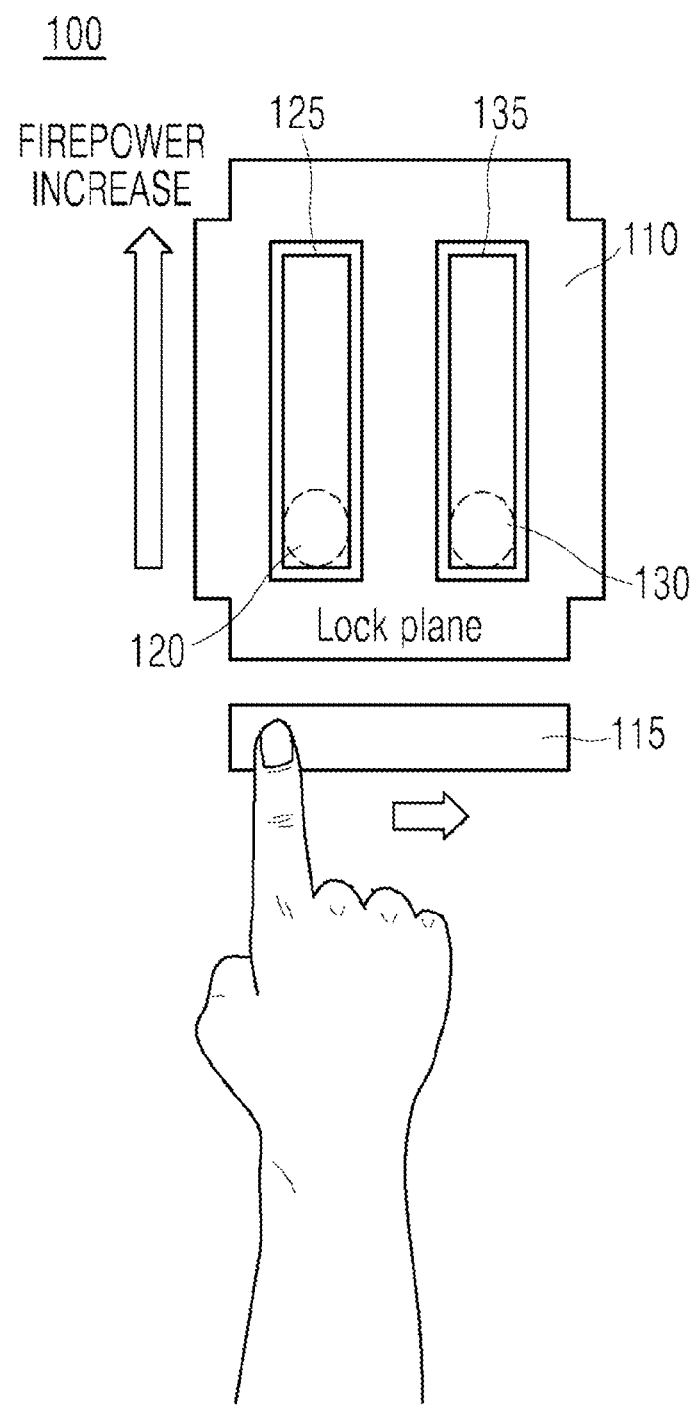
FIG. 9 is a view illustrating a configuration of a touch panel of a heating apparatus in which a lock mode for preventing a safety accident is separately set according to another embodiment of present disclosure.

FIG. 9 is a view illustrating a configuration of a touch panel of a heating apparatus in which a lock mode for preventing a safety accident is separately set according to another embodiment of present disclosure.

In the embodiment of FIG. 9, an active lock touch area 115 is additionally disposed in the configuration of the touch panel of FIGS. 5 and 6.

If the microwave 1000 is not used, or is in use, the user may actively set the locking function to prevent other commands from being inputted.

In the configuration of FIG. 9, the user may set the locking function by slidingly touching the active lock touch area 115 from left to right.

After such an active lock setting, until the user releases the lock, even if another touch operation is made, a new command is not inputted to the microwave 1000.

The lock release may be performed by the user sliding the active lock touch area 115 from right to left.

Figure 10:
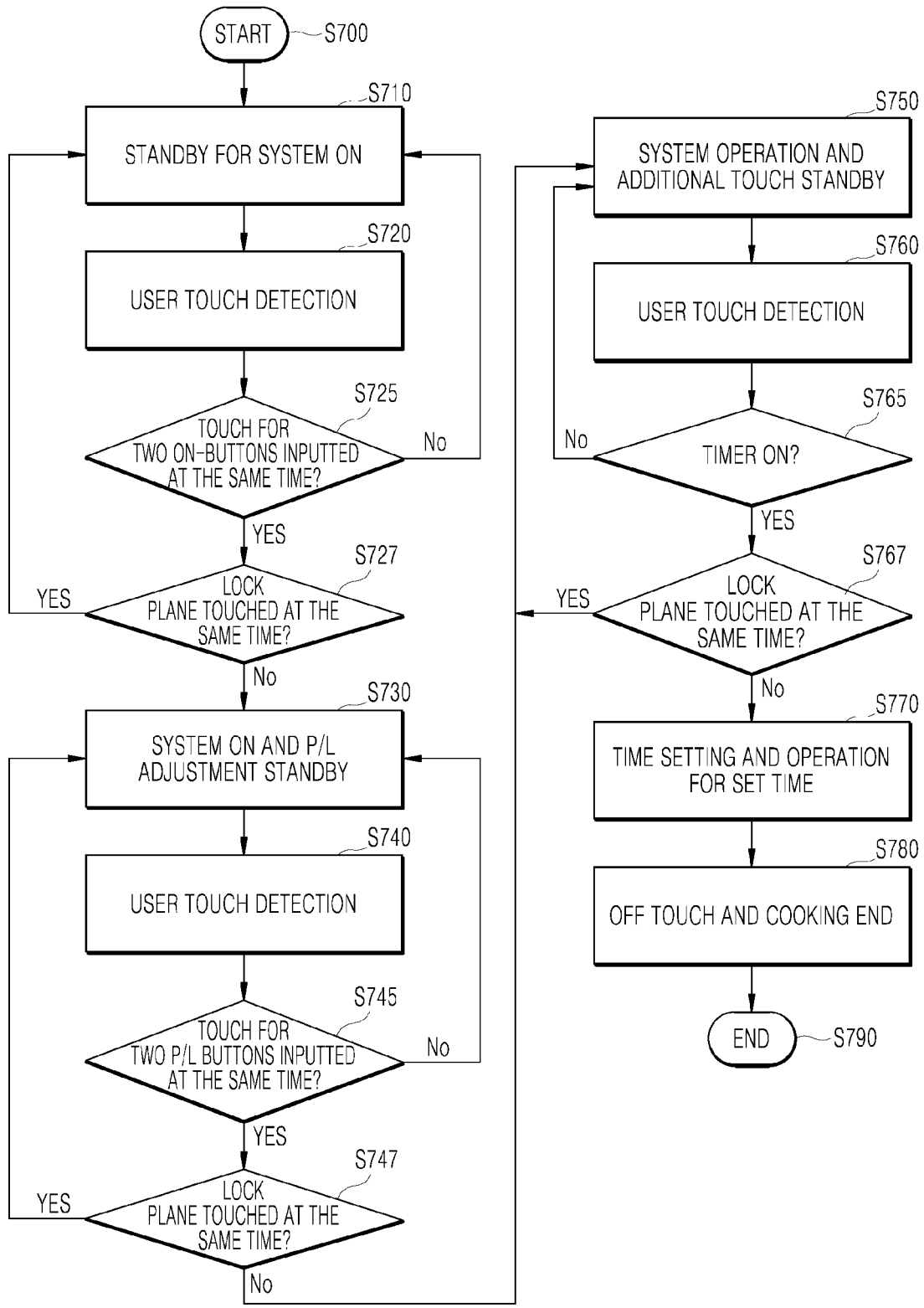
FIG. 10 is a flowchart illustrating a method of controlling a heating apparatus for preventing a safety accident according to an embodiment of present disclosure.

FIG. 10 is a flowchart illustrating a method of controlling a heating apparatus for preventing a safety accident according to an embodiment of present disclosure.

First, the microwave 1000 may wait for the system to be turned on in a state connected to the power (S710). When a user's touch is detected (S720), the controller of the microwave 1000 determines whether both two on-buttons are touched (S725), and if the both two on-buttons are touched, the controller of the microwave 1000 checks whether the lock plane, i.e., the lock touch area, is touched (S727). If the lock plane is being touched, the touch of the on-button is all blocked and the power of the microwave 1000 is not turned on and the standby state is maintained. In addition, if the two on-buttons are not touched at the same time, the standby state is also maintained.

If the two on-buttons are touched at the same time and the lock plane is not touched, the power of the microwave 1000 may be turned on.

That is, by detecting whether there is a touch in the power touch area and the lock touch area of the interface displayed on the top plate of the microwave 1000, if it is detected that the power touch area is touched for a certain time without touching the lock touch area, the power of the microwave 1000 is turned on, and when it is detected that the lock touch area is touched, the input through the power touch area is blocked and the power is not turned on.

Subsequently, it is switched to a control standby state for a power level for heating (S730).

If a user touch is detected (S740), it is determined whether two buttons for power level are simultaneously touched (S745). If so, it is determined whether the lock plane is touched (S747), and if the lock plane is not touched, the system may operate to supply a determined power level to adjust the degree of heating as the touch moves.

If two buttons for power level are not touched at the same time, the system remains in the standby state, and the system may remain in the standby state as well even if the lock plane is touched.

In the additional touch standby state (S750) after the power level is determined, if a user touch is detected (S760), it is determined whether the touch for setting the timer is on (S765). If so, it is determined whether the lock plane is touched at the same time, so that the heating duration time is set according to the touch operation (S767).

When the timer touch is not on or when the lock plane is touched, the timer is not set and the standby state is maintained.

When the cooking is completed, the user touches the off-button and the cooking is finished (S780).

Figure 11:
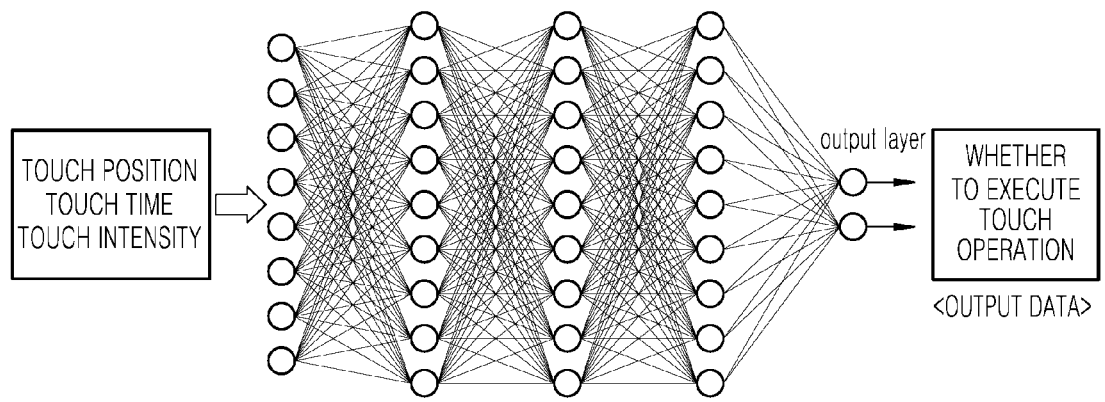
FIG. 11 is a view illustrating a deep neural network model for determining whether to execute an operation according to a touch gesture in a heating apparatus according to an embodiment of present disclosure.

FIG. 11 is a view illustrating a deep neural network model for determining whether to execute an operation according to a touch gesture in a heating apparatus according to an embodiment of present disclosure.

In order to determine whether the detected touch gesture is intended for actual or accidental operation, the microwave 1000 may use a deep neural network model that pre-trained using artificial machine learning.

Artificial intelligence (AI) is an area of computer engineering science and information technology that studies methods to make computers mimic intelligent human behaviors such as reasoning, learning, self-improving, and the like.

Also, AI does not exist on its own, but is rather directly or indirectly related to a number of other fields in computer science. In recent years, there have been numerous attempts to introduce an element of AI into various fields of information technology to solve problems in the respective fields.

Machine learning is an area of artificial intelligence that includes the field of study that gives computers the capability to learn without being explicitly programmed.

More specifically, machine learning is a technology that investigates and builds systems, and algorithms for such systems, that are capable of learning, making predictions, and enhancing its own performance on the basis of experiential data. Machine learning algorithms, rather than only executing rigidly set static program commands, may be used to take an approach that builds models for deriving predictions and decisions from inputted data.

The term 'machine learning' may be used interchangeably with the term 'mechanical learning'.

Numerous machine learning algorithms have been developed for data classification in machine learning. Representative examples of such machine learning algorithms for data classification include a decision tree, a Bayesian network, a support vector machine (SVM), an artificial neural network (ANN), and so forth.

Decision tree refers to an analysis method that uses a tree-like graph or model of decision rules to perform classification and prediction.

Bayesian network may include a model that represents the probabilistic relationship (conditional independence) among a set of variables. Bayesian network may be appropriate for data mining via unsupervised learning.

SVM may include a supervised learning model for pattern detection and data analysis, heavily used in classification and regression analysis.

ANN is a data processing system modelled after the mechanism of biological neurons and interneuron connections, in which a number of neurons, referred to as nodes or processing elements, are interconnected in layers.

ANNs are models used in machine learning and may include statistical learning algorithms conceived from biological neural networks (particularly of the brain in the central nervous system of an animal) in machine learning and cognitive science.

ANNs may refer generally to models that have artificial neurons (nodes) forming a network through synaptic interconnections, and acquires problem-solving capability as the strengths of synaptic interconnections are adjusted throughout training.

The terms 'artificial neural network' and 'neural network' may be used interchangeably herein.

An ANN may include a number of layers, each including a number of neurons. Furthermore, the ANN may include synapses that connect the neurons to one another.

An ANN may be defined by the following three factors: (1) a connection pattern between neurons on different layers; (2) a learning process that updates synaptic weights; and (3) an activation function generating an output value from a weighted sum of inputs received from a previous layer.

ANNs include, but are not limited to, network models such as a deep neural network (DNN), a recurrent neural network (RNN), a bidirectional recurrent deep neural network (BRDNN), a multilayer perception (MLP), and a convolutional neural network (CNN).

In this specification, the term 'layer' may be used interchangeably with the term 'level'.

An ANN may be classified as a single-layer neural network or a multi-layer neural network, based on the number of layers therein.

In general, a single-layer neural network may include an input layer and an output layer.

In general, a multi-layer neural network may include an input layer, one or more hidden layers, and an output layer.

The input layer receives data from an external source, and the number of neurons in the input layer is identical to the number of input variables. The hidden layer is located between the input layer and the output layer, and receives signals from the input layer, extracts features, and feeds the extracted features to the output layer. The output layer receives a signal from the hidden layer and outputs an output value based on the received signal. Input signals between the neurons are summed together after being multiplied by corresponding connection strengths (synaptic weights), and if this sum exceeds a threshold value of a corresponding neuron, the neuron may be activated and output an output value obtained through an activation function.

A deep neural network with a plurality of hidden layers between the input layer and the output layer may be the most representative type of artificial neural network which enables deep learning, which is one machine learning technique.

On the other hand, the term 'deep learning' may be used interchangeably with the term 'in-depth learning'.

An ANN may be trained using training data. Here, the training may refer to the process of determining parameters of the artificial neural network by using the training data, to perform tasks such as classification, regression analysis, and clustering of inputted data. Such parameters of the artificial neural network may include synaptic weights and biases applied to neurons.

An artificial neural network trained using training data may classify or cluster inputted data according to a pattern within the inputted data.

Throughout the present specification, an artificial neural network trained using training data may be referred to as a trained model.

Hereinbelow, learning paradigms of an artificial neural network will be described in detail.

Learning paradigms, in which an artificial neural network operates, may be classified into supervised learning, unsupervised learning, semi-supervised learning, and reinforcement learning.

Supervised learning is a machine learning method that derives a single function from the training data.

Among the functions that may be thus derived, a function that outputs a continuous range of values may be referred to as a regressor, and a function that predicts and outputs the class of an input vector may be referred to as a classifier.

In supervised learning, an artificial neural network may be trained with training data that has been given a label.

Here, the label may refer to a target answer (or a result value) to be guessed by the artificial neural network when the training data is inputted to the artificial neural network.

Throughout the present specification, the target answer (or a result value) to be guessed by the artificial neural network when the training data is inputted may be referred to as a label or labeling data.

Throughout the present specification, assigning one or more labels to training data in order to train an artificial neural network may be referred to as labeling the training data with labeling data.

Training data and labels corresponding to the training data together may form a single training set, and as such, they may be inputted to an artificial neural network as a training set.

The training data may exhibit a number of features, and the training data being labeled with the labels may be interpreted as the features exhibited by the training data being labeled with the labels. In this case, the training data may represent a feature of an input object as a vector.

Using training data and labeling data together, the artificial neural network may derive a correlation function between the training data and the labeling data. Then, through evaluation of the function derived from the artificial neural network, a parameter of the artificial neural network may be determined (optimized).

Unsupervised learning is a machine learning method that learns from training data that has not been given a label.

More specifically, unsupervised learning may be a training scheme that trains an artificial neural network to discover a pattern within given training data and perform classification by using the discovered pattern, rather than by using a correlation between given training data and labels corresponding to the given training data.

Examples of unsupervised learning include, but are not limited to, clustering and independent component analysis.

In this specification, the term 'grouping' may be used interchangeably with the term 'clustering'.

Examples of artificial neural networks using unsupervised learning include, but are not limited to, a generative adversarial network (GAN) and an autoencoder (AE).

GAN is a machine learning method in which two different artificial intelligences, a generator and a discriminator, improve performance through competing with each other.

The generator may be a model generating new data that generates new data based on true data.

The discriminator may be a model recognizing patterns in data that determines whether inputted data is from the true data or from the new data generated by the generator.

Furthermore, the generator may receive and learn from data that has failed to fool the discriminator, while the discriminator may receive and learn from data that has succeeded in fooling the discriminator. Accordingly, the generator may evolve so as to fool the discriminator as effectively as possible, while the discriminator evolves so as to distinguish, as effectively as possible, between the true data and the data generated by the generator.

An auto-encoder (AE) is a neural network which aims to reconstruct its input as output.

More specifically, AE may include an input layer, at least one hidden layer, and an output layer.

Since the number of nodes in the hidden layer is smaller than the number of nodes in the input layer, the dimensionality of data is reduced, thus leading to data compression or encoding.

Furthermore, the data outputted from the hidden layer may be inputted to the output layer. Given that the number of nodes in the output layer is greater than the number of nodes in the hidden layer, the dimensionality of the data increases, thus leading to data decompression or decoding.

Furthermore, in the AE, the inputted data is represented as hidden layer data as interneuron connection strengths are adjusted through training. The fact that when representing information, the hidden layer is able to reconstruct the inputted data as output by using fewer neurons than the input layer may indicate that the hidden layer has discovered a hidden pattern in the inputted data and is using the discovered hidden pattern to represent the information.

Semi-supervised learning is machine learning method that makes use of both labeled training data and unlabeled training data.

One semi-supervised learning technique involves reasoning the label of unlabeled training data, and then using this reasoned label for learning. This technique may be used advantageously when the cost associated with the labeling process is high.

Reinforcement learning may be based on a theory that given the condition under which a reinforcement learning agent may determine what action to choose at each time instance, the agent may find an optimal path to a solution solely based on experience without reference to data.

Reinforcement learning may be performed mainly through a Markov decision process.

Markov decision process consists of four stages: first, an agent is given a condition containing information required for performing a next action; second, how the agent behaves in the condition is defined; third, which actions the agent should choose to get rewards and which actions to choose to get penalties are defined; and fourth, the agent iterates until future reward is maximized, thereby deriving an optimal policy.

An artificial neural network is characterized by features of its model, the features including an activation function, a loss function or cost function, a learning algorithm, an optimization algorithm, and so forth. Also, the hyperparameters are set before learning, and model parameters may be set through learning to specify the architecture of the artificial neural network.

For instance, the structure of an artificial neural network may be determined by a number of factors, including the number of hidden layers, the number of hidden nodes included in each hidden layer, input feature vectors, target feature vectors, and so forth.

Hyperparameters may include various parameters which need to be initially set for learning, much like the initial values of model parameters. Also, the model parameters may include various parameters sought to be determined through learning.

For instance, the hyperparameters may include initial values of weights and biases between nodes, mini-batch size, iteration number, learning rate, and so forth. Furthermore, the model parameters may include a weight between nodes, a bias between nodes, and so forth.

Loss function may be used as an index (reference) in determining an optimal model parameter during the learning process of an artificial neural network. Learning in the artificial neural network involves a process of adjusting model parameters so as to reduce the loss function, and the purpose of learning may be to determine the model parameters that minimize the loss function.

Loss functions typically use means squared error (MSE) or cross entropy error (CEE), but the present disclosure is not limited thereto.

Cross-entropy error may be used when a true label is one-hot encoded. One-hot encoding may include an encoding method in which among given neurons, only those corresponding to a target answer are given 1 as a true label value, while those neurons that do not correspond to the target answer are given 0 as a true label value.

In machine learning or deep learning, learning optimization algorithms may be deployed to minimize a cost function, and examples of such learning optimization algorithms include gradient descent (GD), stochastic gradient descent (SGD), momentum, Nesterov accelerate gradient (NAG), Adagrad, AdaDelta, RMSProp, Adam, and Nadam.

GD includes a method that adjusts model parameters in a direction that decreases the output of a cost function by using a current slope of the cost function.

The direction in which the model parameters are to be adjusted may be referred to as a step direction, and a size by which the model parameters are to be adjusted may be referred to as a step size.

Here, the step size may mean a learning rate.

GD obtains a slope of the cost function through use of partial differential equations, using each of model parameters, and updates the model parameters by adjusting the model parameters by a learning rate in the direction of the slope.

SGD may include a method that separates the training dataset into mini batches, and by performing gradient descent for each of these mini batches, increases the frequency of gradient descent.

Adagrad, AdaDelta and RMSProp may include methods that increase optimization accuracy in SGD by adjusting the step size, and may also include methods that increase optimization accuracy in SGD by adjusting the momentum and step direction. In SGD, momentum and NAG are techniques that increase the optimization accuracy by adjusting the step direction. Adam may include a method that combines momentum and RMSProp and increases optimization accuracy in SGD by adjusting the step size and step direction. Nadam may include a method that combines NAG and RMSProp and increases optimization accuracy by adjusting the step size and step direction.

Learning rate and accuracy of an artificial neural network rely not only on the structure and learning optimization algorithms of the artificial neural network but also on the hyperparameters thereof. Therefore, in order to obtain a good learning model, it is important to choose a proper structure and learning algorithms for the artificial neural network, but also to choose proper hyperparameters.

In general, the artificial neural network is first trained by experimentally setting hyperparameters to various values, and based on the results of training, the hyperparameters may be set to optimal values that provide a stable learning rate and accuracy.

By using the above methods, the estimation of the state of an element to be heated may be further refined.

There may be various ways to generate a deep neural network model to be used in an embodiment of present disclosure, and in the case of supervised learning, the following training process may be performed as a preliminary work.

The microwave 1000 may detect a user's touch position, touch time, and touch intensity detected by the microwave 1000 for a predetermined time, and then configure the training dataset by labeling whether a user actually provides an intended touch or an accidental touch.

When training a deep neural network model with this training data, the trained learning model then reflects the characteristics of the user, and when the user's touch is applied, it is possible to determine whether to execute the operation according to the touch.

The user continuously provides feedback on the determination result of the deep neural network model, so that this learning model may be further refined.

According to an embodiment of present disclosure, the user's intended touch and accidental touch may be distinguished. If not intended, a safety accident caused by turning on the heating apparatus and starting a heating operation may be prevented.

In addition, according to an embodiment of present disclosure, it is possible to distinguish between an intentional touch and an accidental touch without additional equipment, and it is possible to prevent the power from turning on for accidental touch.

In addition, according to an embodiment of present disclosure, a gesture set to select an operation of the heating apparatus may intuitively express the user's intention.

In addition, according to an embodiment of present disclosure, in order to minimize inconvenience in operating heating apparatus, by suggesting a new user interface, it is possible to control power and heating levels with a touch that leads to a single operation without going through multiple steps and it is possible to discriminate the user's manipulation by the user's intended touch, and even prevent safety accidents.

In addition, according to an embodiment of present disclosure, the power and heating level of the heating apparatus may be controlled by the operation leading to one touch, and even if the user does not use the locking function separately, the locking effect may be achieved automatically so that safety may be secured.

The above-mentioned embodiments of the present disclosure may be implemented as a computer program executable by various components on a computer, and such the computer program may be recorded in a computer-readable medium.

The example embodiments described above may be implemented through computer programs executable through various components on a computer, and such computer programs may be recorded in computer-readable media. Examples of the computer-readable media include, but are not limited to: magnetic media such as hard disks, floppy disks, and magnetic tape; optical media such as CD-ROM disks and DVD-ROM disks; magneto-optical media such as floptical disks; and hardware devices that are specially configured to store and execute program codes, such as ROM, RAM, and flash memory devices.

The computer programs may be those specially designed and constructed for the purposes of the present disclosure or they may be of the kind well known and available to those skilled in the computer software arts. Examples of program code include both machine code, such as produced by a compiler, and higher level code that may be executed by the computer using an interpreter.

As used in the present application (especially in the appended claims), the terms 'a/an' and 'the' include both singular and plural references, unless the context clearly states otherwise. Also, it should be understood that any numerical range recited herein is intended to include all sub-ranges subsumed therein (unless expressly indicated otherwise) and therefore, the disclosed numeral ranges include every individual value between the minimum and maximum values of the numeral ranges.

Also, the order of individual steps in process claims of the present disclosure does not imply that the steps must be performed in this order; rather, the steps may be performed in any suitable order, unless expressly indicated otherwise. In other words, the present disclosure is not necessarily limited to the order in which the individual steps are recited. All examples described herein or the terms indicative thereof ("for example", etc.) used herein are merely to describe the present disclosure in greater detail. Therefore, it should be understood that the scope of the present disclosure is not limited to the example embodiments described above or by the use of such terms unless limited by the appended claims. Also, it should be apparent to those skilled in the art that various alterations, permutations, and modifications may be made within the scope of the appended claims or equivalents thereof.

The present disclosure is thus not limited to the example embodiments described above, and rather intended to include the following appended claims, and all modifications, equivalents, and alternatives falling within the spirit and scope of the following claims.

What is claimed is:

1. A heating apparatus for preventing safety accidents, the apparatus comprising:
   a top plate configured to support a heating target;
   a heater disposed under the top plate to heat the heating target;
   an interface displayed on the top plate to allow a user to select an operation of the heating apparatus; and
   a controller configured to control on, off, and heating operations of the heating apparatus according to the selection through the interface,
   wherein the interface comprises a power touch area and an inactive area,
   wherein the controller is configured to turn on the power of the heating apparatus in response that the power touch area is touched, and configured to block an input of the power touch area in response that the inactive area is touched,
   wherein the power touch area comprises a first touch area and a second touch area separated from each other,
   wherein the inactive area is disposed to surround at least one of the first touch area and the second touch area,
   wherein the controller is configured to turn on the power only when the first touch area and the second touch area are touched together, and
   wherein the controller is further configured to increase a heating level of the heating apparatus in response to a touch moving from a lower part to an upper part in the length direction of the first touch area and the second touch area.

2. The heating apparatus of claim 1, wherein the controller is further configured to turn on the power of the heating apparatus based on that the power touch area is touched for a predetermined time or more.

3. The heating apparatus of claim 1, wherein the first touch area and the second touch area have a shape in which a length is longer than a width, and the first touch area and the second touch area are disposed parallel to each other in a length direction,
   wherein the controller is further configured to turn on the power of the heating apparatus based on that the lower part of the first touch area and the lower part of the second touch area are touched together.

4. The heating apparatus of claim 3, wherein after the power of the heating apparatus is turned on, in a state where only the second touch area is touched, in response that a user's touch moves from the lower part to the upper part in the length direction of the second touch area, the controller is further configured to increase a heating duration time of the heating apparatus.

5. The heating apparatus of claim 1, wherein the first touch area is a circle,
   wherein the second touch area is disposed to surround at least a portion of the first touch area in a truncated fan shape, wherein the inactive area is disposed between the first touch area and the second touch area to surround at least a portion of the first touch area, wherein the controller is further configured to turn on the heating apparatus based on that the first touch area and the second touch area are touched together for a predetermined time or more.

6. The heating apparatus of claim 5, wherein after the power of the heating apparatus is turned on, in a state where the first touch area and the second touch area are touched together, in response that a touch in the second touch area moves counterclockwise or clockwise, the controller is further configured to increase a heating level in proportion to a traveled distance of the touch.

7. The heating apparatus of claim 5, wherein after the power of the heating apparatus is powered on, in a state where only the second touch area is touched, in response that a touch in the second touch area moves counterclockwise or clockwise, the controller is further configured to increase a heating duration time of the heating apparatus in proportion to a traveled distance of the touch.

8. A control method of a heating apparatus for preventing safety accidents, the method comprising:

detecting whether a power touch area or an inactive area is touched in an interface displayed on a top plate of the heating apparatus;

turning on the power of the heating apparatus in response that it is detected that the power touch area is touched for a predetermined time without touching the inactive area; and blocking an input through the power touch area in response that it is detected that the inactive area is touched, wherein the power touch area comprises a first touch area and a second touch area separated from each other, wherein the inactive area is disposed to surround at least one of the first touch area and the second touch area, wherein the first touch area and the second touch area have a shape in which a length is longer than a width, and the first touch area and the second touch area are disposed parallel to each other in a length direction, wherein the power of the heating apparatus is turned on in response to a lower part of the first touch area and a lower part of the second touch area being touched together for the predetermined time or more, and increasing a heating level of the heating apparatus in response to a touch moving from a lower part to an upper part in the length direction of the first touch area and the second touch area.

9. The method of claim 8, wherein the turning on the power comprises turning on the power of the heating apparatus in response that the first touch area and the second touch area are touched together for a predetermined time or more.

10. The method of claim 8, further comprising, after the power of the heating apparatus is turned on, in a state where only the second touch area is touched, in response that it is detected that a touch moves from the lower part to the upper part in the length direction of the second touch area, increasing a heating duration time of the heating apparatus.

11. The method of claim 8, wherein the first touch area is a circle, wherein the second touch area is disposed to surround at least a portion of the first touch area in a truncated fan shape, wherein the inactive area is disposed between the first touch area and the second touch area to surround at least a portion of the first touch area, wherein the turning on the power comprises turning on the power of the heating apparatus in response that it is detected that the first touch area and the second touch area are touched together for a predetermined time or more.

12. The method of claim 11, further comprising, after the power of the heating apparatus is turned on, in a state where the first touch area and the second touch area are touched together, in response that it is detected that a touch in the second touch area moves counterclockwise or clockwise, increasing a heating level in proportion to a traveled distance.

13. The method of claim 11, further comprising, after the power of the heating apparatus is powered on, in a state where only the second touch area is touched, in response that it is detected that a touch in the second touch area moves counterclockwise or clockwise, increasing a heating duration time of the heating apparatus in proportion to a traveled distance of the touch.

14. A non-transitory computer-readable recording medium storing a computer program for executing the method of claim 8 using a computer.

* * * * *